(12) United States Patent
Eis et al.

(10) Patent No.: US 6,290,599 B1
(45) Date of Patent: Sep. 18, 2001

(54) CONTROL UNIT FOR AGRICULTURAL HARVESTERS

(75) Inventors: Günter Eis, Harsewinkel; Heinrich Isfort, Dülmen, both of (DE)

(73) Assignee: Claas Selbstfahrende Erntemaschinen GmbH, Harsewinkel (DE)

( * ) Notice: Subject to any disclaimer, the term of this patent is extended or adjusted under 35 U.S.C. 154(b) by 0 days.

(21) Appl. No.: 09/409,516

(22) Filed: Sep. 30, 1999

(30) Foreign Application Priority Data

Sep. 30, 1998 (DE) .............................................. 198 44 894

(51) Int. Cl.⁷ ..................................................... A01F 15/04
(52) U.S. Cl. ............................................... 460/62; 460/109
(58) Field of Search ........................... 56/10.2 R, 10.2 A, 56/10.9, 1; 460/62, 76, 109, 141

(56) References Cited

U.S. PATENT DOCUMENTS

| | | | |
|---|---|---|---|
| 4,425,925 | * | 1/1984 | Kersting et al. ........................ 460/62 |
| 4,802,496 | * | 2/1989 | Bennett ................................. 460/109 |
| 5,488,817 | * | 2/1996 | Paquet et al. ...................... 56/10.2 R |
| 5,743,795 | * | 4/1998 | Kersting ................................. 460/62 |

FOREIGN PATENT DOCUMENTS

| | | | |
|---|---|---|---|
| 282 836 A5 | 9/1990 | (DD) | .............................. A01F/15/08 |
| 43 08 084 A1 | 9/1994 | (DE) | .............................. A01D/69/00 |
| 196 40 061 A1 | 4/1998 | (DE) | .............................. A01F/15/04 |

* cited by examiner

*Primary Examiner*—Robert E. Pezzuto
(74) *Attorney, Agent, or Firm*—Husch & Eppenberger, LLC; Robert E. Muir

(57) ABSTRACT

A control unit for an agricultural harvesting machine is arranged so that the width of a passage or opening between two machine elements can be precisely adjusted as simply as possible. Adjustable stops are in the form of plungers are displaceably guided in cylinders. Each cylinder is connected to a multi-chamber pump which contains a displaceable stepped piston. Individual chambers of the multi-chamber pump and the steps of the piston are mutually matched so that the same quantity of hydraulic fluid is squeezed out from the two chambers of the multi-chamber pump and the plungers move in and out in synchronism. The control unit is particularly suitable for use in foragers, combines other agricultural harvesting machines.

17 Claims, 4 Drawing Sheets

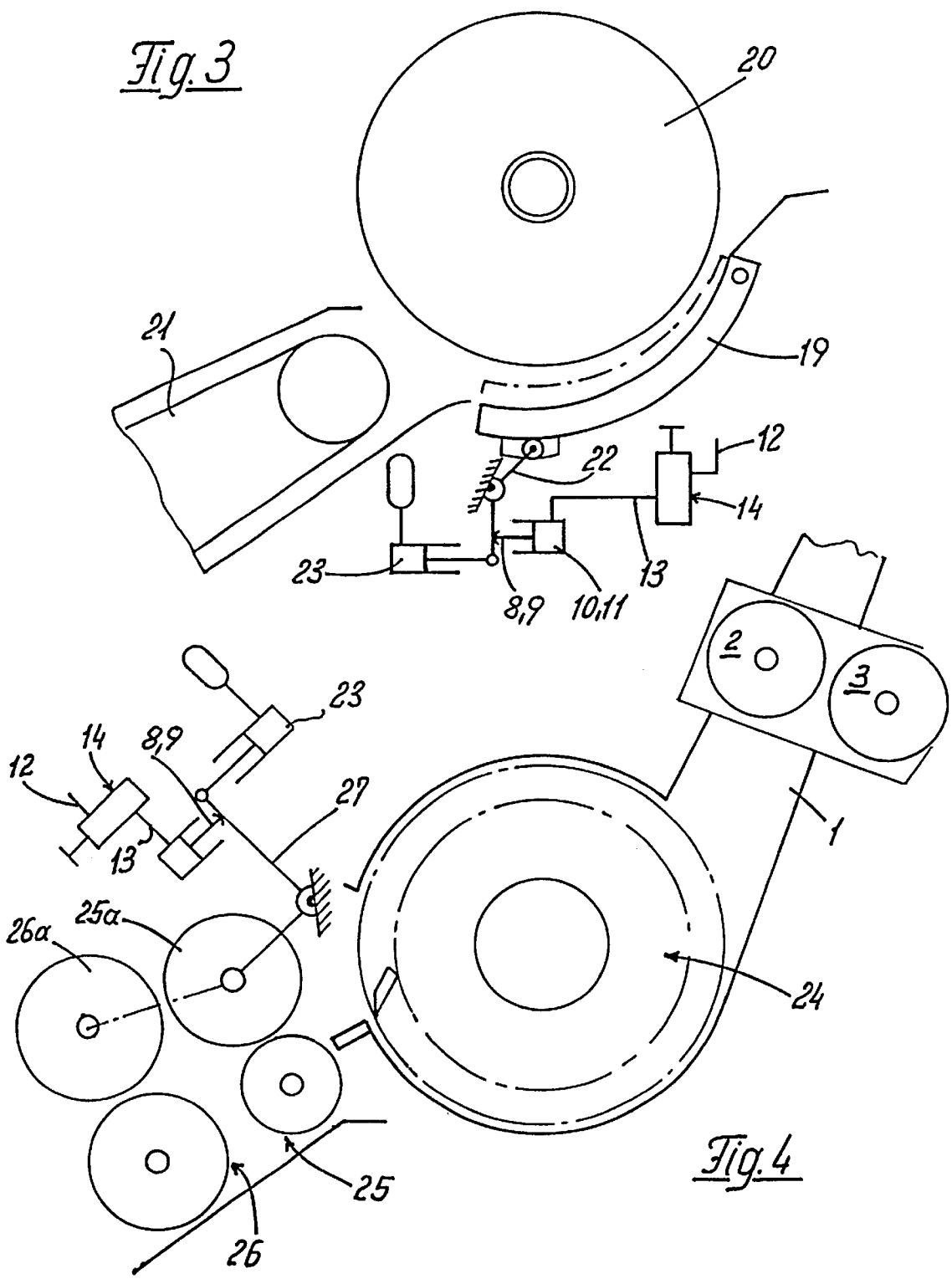

CONTROL UNIT FOR AGRICULTURAL HARVESTERS

BACKGROUND OF THE INVENTION

The present invention relates generally to agricultural machines and, more particularly, to a control unit for use in an agricultural harvester having a feed path and for controlling machine elements which interact along the feed path.

The control unit being considered is for forage harvesters, combine harvesters and other agricultural harvesting machines. The mutually adjustable machine elements may be of various constructions or arrangements. For example, in the case of forage harvesters used for chopping corn, two so-called cracker rollers must be adjusted relative to one another to release the grains of corn. In the case of combine harvesters, the concave and threshing cylinder must be mutually adjusted. The machine elements or groups of elements under consideration are usually located within or along the feed path for the crop.

The harvesting machines discussed above are available in a wide variety. Consequently, two laterally disposed stops are needed for each machine element or for each group of elements. Historically, these stops have been in the form of bolts that can be screwed-in or out of a threaded member. Alternately, the stops have been wedge-shaped segments that were indirectly driven between a fixed and an adjustable machine element. The machine elements needed for the adjustment process are usually arranged on rocker arms, levers or the like. Adjustments made with bolts are laborious and imprecise because the adjustments are made without the assistance of calipers, measuring instruments or the like. Moreover, the levers or rocker arms that support the elements being adjusted are subject to wear so that adjustments become more imprecise in the course of time.

SUMMARY OF THE INVENTION

In accordance with the present invention, there is provided a control unit for an agricultural machine having feed means for feeding harvested crops along a feed path, a plurality of machine elements along the feed path, resilient means for moving one of the machine elements relative to another, adjustable stops for limiting movement of the resilient means. Further, the control unit includes a plurality of hydraulic cylinders each having a moveable wall forming one of the adjustable stops, and means for supplying controlled amounts of hydraulic fluid to each of the hydraulic cylinders to move the respective moveable walls a controlled distance, and thereby moving said one and other machine elements relative to each other. For the purposes of altering the width of the feed path for crops, at least one of these machine elements is positioned by resilient members using adjustable stops, wherein the stops are plungers which are moveable in synchronism by means of an applied fluid.

The solution according to the preferred embodiment makes it possible to overcome one or more of the problems described above and facilitate precise adjustments in an efficient manner.

BRIEF DESCRIPTION OF THE DRAWING

Reference is now made more particularly to the drawings which illustrate the best presently known mode of carrying out the invention and wherein similar reference characters indicate the same parts throughout the views.

FIG. 3 is a schematic view showing the control unit used with an adjustable concave and a threshing cylinder.

FIG. 4 is a schematic side view showing the control unit used with a pair of rollers.

DETAILED DESCRIPTION

Figure 1:
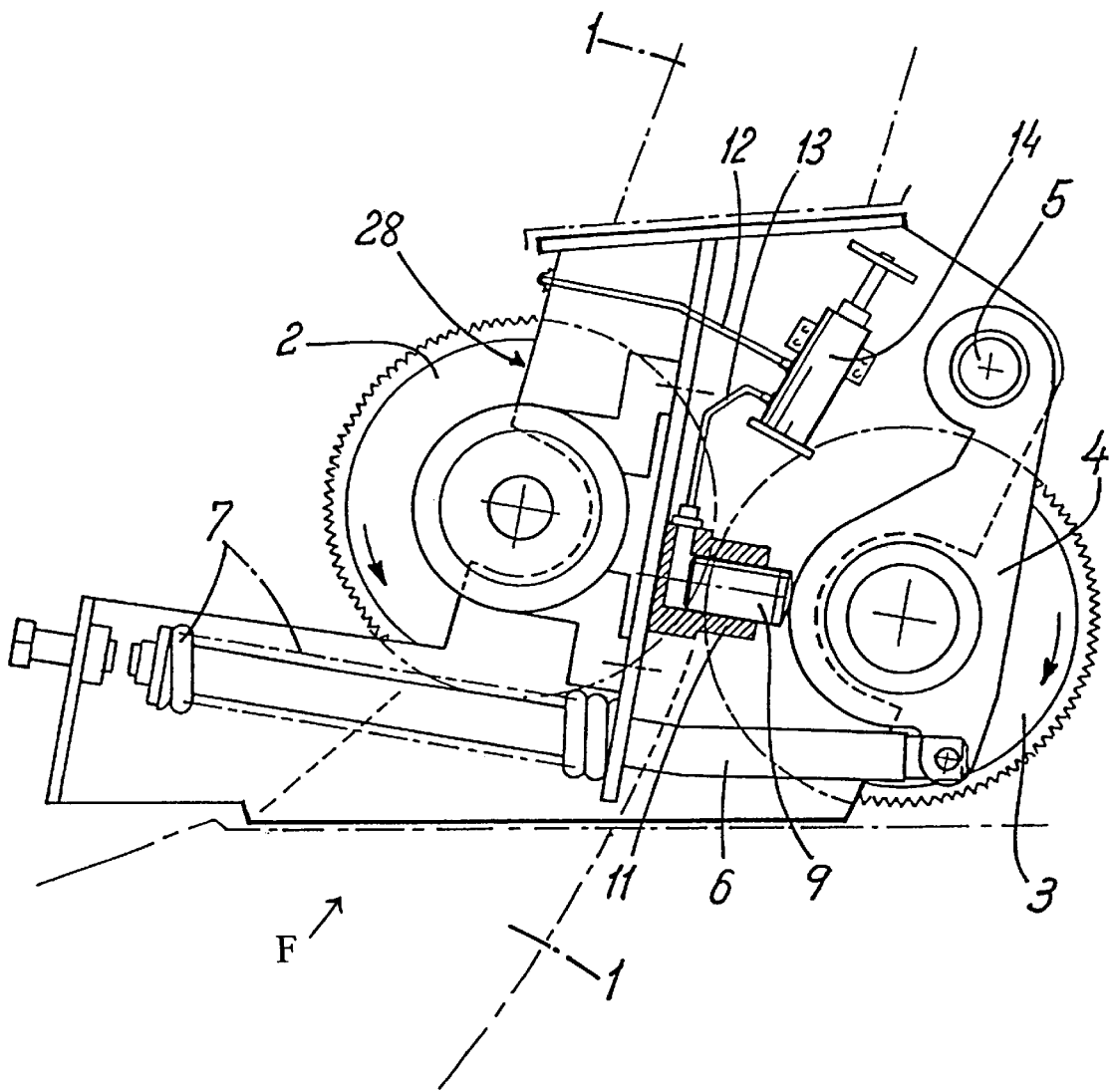
FIG. 1 is a side view of a control unit embodying the invention and used with a pair of cracking rollers.

A forage harvesting machine is shown only partially in FIG. 1. Feed means F supplies harvested crops to a feed path or feed channel 1 which is indicated by dot-dash lines. Machine elements in the form of two cracking rollers 2, 3 project partially into feed channel 1. Such cracking rollers are used when the forage harvester is used to harvest corn. The grains are released i.e. partially pounded by the cracking rollers. The cracking rollers 2, 3 are driven in opposite directions in the usual manner (not described). The cracking roller 2 on the left in FIG. 1 is located at a fixed position, while the cracking roller 3 on the right is mounted at each side in a respective rocker arm 4. Rocker arms 4 are pivotal about a horizontal axis 5. Levers 6 are articulated to the lateral rocker arms 4. The adjustable cracking roller 3 is drawn towards the cracking roller 2 by means of springs 7. If hay, grass or the like is being harvested by the forage harvester, the housing block 28 incorporating the cracking rollers 2, 3 is removed and replaced by a simple housing that encloses the feed path.

The spacing between the cracking roller 3 and the cracking roller 2 and thus the width of the passage between these two rollers is determined by two lateral plungers 8, 9 which form adjustable stops for the rocker arms 4. The plungers 8, 9 are disposed in hydraulic cylinders 10, 11 in displaceable manner. These two cylinders 10, 11 are connected to a multi-chamber pump 14 via a fluid flow path comprising two pressure lines 12, 13. The multi-chamber pump 14 is provided with two connectors 14a and 14b for this purpose.

The multi-chamber pump 14 is designed so that, depending on the adjustment being made, the same quantity of fluid will be supplied to each of the cylinders 10, 11 or vice versa; i.e., so that the same quantity of fluid can flow from the cylinders 10, 11 back to the multi-chamber pump 14. Thus, each of the inwardly or outwardly moving plungers 8, 9 will move by the same amount ensuring that the machine elements or groups of elements will always be precisely adjusted. The machine elements or groups of elements only need to be adjusted by operating the multi-chamber pump 14 in an appropriate manner. The pump 14 can be installed at any suitable and easily accessible position. In agricultural harvesting machines, the pump 14 may be installed in the operator's cab.

A simple form of construction for the multi-chamber pump 14 is obtained when the number of chambers of the multi-chamber pump is equal to the number of cylinders 10, 11 that are to be controlled, and when the pump has a piston 15 that is stepped so that the same quantity of fluid always flows in or out of the chambers during the operation of the piston. As a result, the machine elements and groups of elements can be precisely adjusted using a small number of components. As is apparent from FIG. 2, the multi-chamber pump 14 contains two chambers of differing diameters corresponding to the number of cylinders 10, 11 attached thereto. In the embodiment shown, the individual chambers are, however, continuous since a piston 15, which is stepped in correspondence with the diameters of the chambers, traverses the multi-chamber pump 14. The chambers and the piston 15 are designed such that the same quantity of fluid, preferably, a hydraulic fluid, is forced out of the two chambers during the traverse of the piston 15, or such that, when the piston 15 traverses in the opposite direction, the same quantity of fluid can flow into the chambers. The two plungers 8, 9 are thereby always ganged i.e. driven in synchronism.

The simplest solution is to adjust the piston 15 in the multi-chamber pump 14 manually. This adjustment can be done using a threaded spindle 16. However, the adjustment could also be made with the aid of a servo-mechanism, which may, for example, be an electrically driven motorized arrangement or a controlled piston-cylinder unit. In accordance with FIG. 2, the traversing action of the piston 15 is effected manually since piston 15 is disposed on a threaded spindle 16 which can be rotated by means of a hand wheel 17. In the embodiment illustrated, a bar acting as an indicator 18 is arranged on the hand wheel 17 so that the width of the passage between the two cracking rollers 2 and 3 can be determined from the position of the bar relative to the end face of the multi-chamber pump 14. As an alternative to that shown in the illustration, the piston 15 could also be adjusted by means of a servo-mechanism, an electric motor or a piston-cylinder unit, for example. The multi-chamber pump 14 is installed in the operator's cab of the agricultural harvesting machine in a manner which is not illustrated in detail so that the driver can adjust the cracking rollers 2, 3 from the cab. To be most useful, the multi-chamber pump 14 should be installed in the operator's cab and may be provided with an indicator for showing the size of the opening or the width of the passage. The cylinders 10, 11 accommodating the plungers 8, 9 can be mounted in various manners. For example, the cylinders can be arranged on fixed components of the agricultural harvesting machine. Also, the plungers 8, 9 can be effective directly or indirectly on the adjustable machine elements or groups of elements. Alternatively, the cylinders 10, 11 accommodating the plungers 8, 9 can be arranged on the adjustable components, and the plungers 8, 9 can be effective on the fixed components of the agricultural harvesting machine. In particularly effective arrangements, the springs 7 retaining the adjustable components or the groups of elements in their operational position are tension springs, compression springs, or counter-balancing cylinders. In principle, any known means for storing power can be used. These springs allow the machine elements or groups of elements to yield in the event of an increased throughput of the crop, for example.

Figure 2:
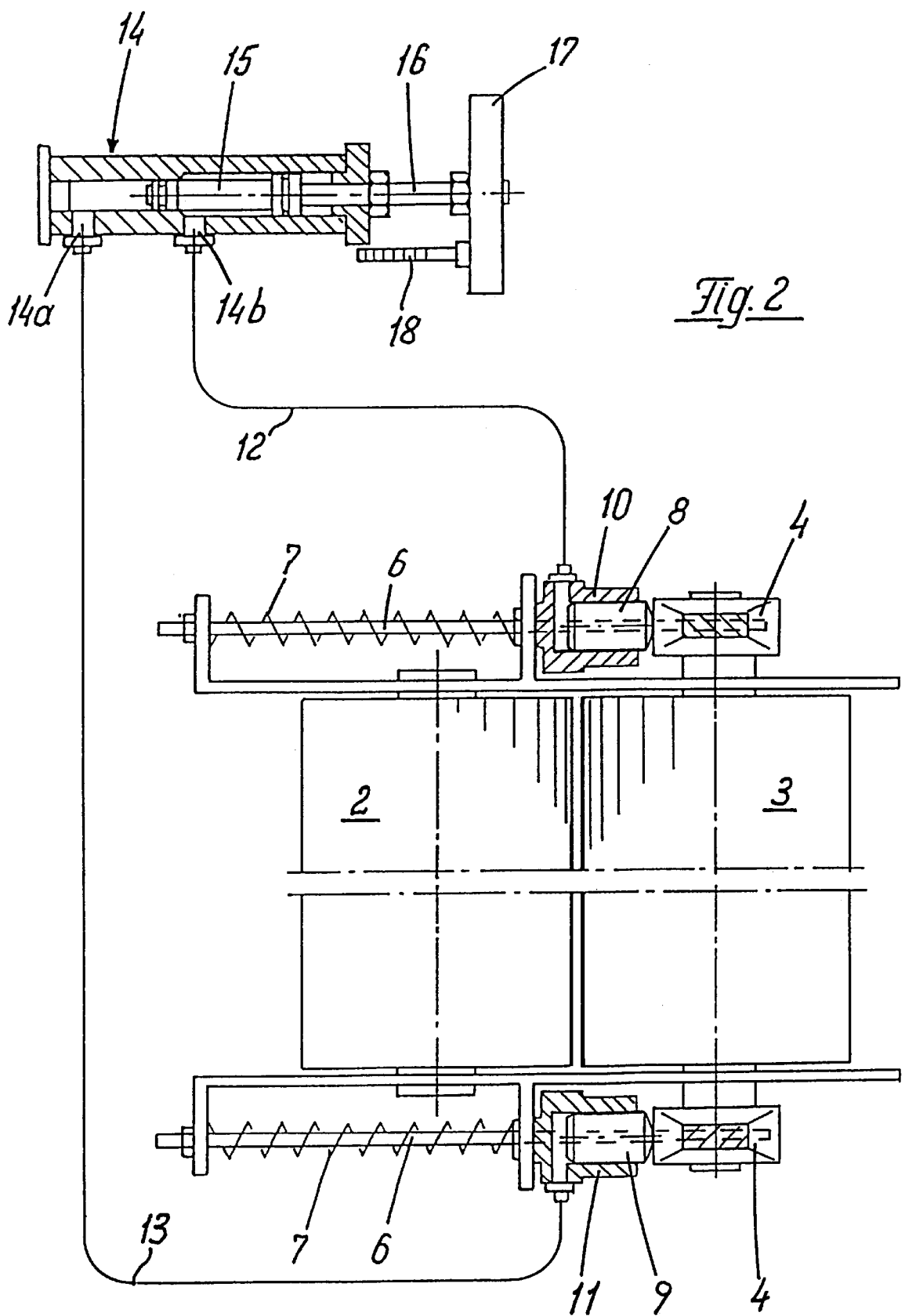
FIG. 2 is a schematic top view corresponding to FIG. 1.

Depending on the type of machine elements or groups of elements involved, it may be advantageous if the plungers 8, 9 are not effective directly on the machine elements or on the groups of elements. FIG. 3 depicts the adjustment of a concave 19 relative to a threshing cylinder 20. The crop being threshed is supplied to the threshing device by means of a feed rake 21. Double-arm levers 22 are articulated to each side of the concave 19 at its inlet end. Power storage means (e.g. resilient means) in the form of counter-balancing cylinders 23 are attached to the free ends of the two double-arm levers 22. The plungers 8, 9, which are displaceable in the cylinders 10, 11 in a manner similar to the embodiments of FIGS. 1 and 2, are effective on the distal ends of the two double-arm levers 22. This arrangement is advantageous when adjusting the concave 19, for example.

Two pairs of compression rollers 25, 26 precede a chopping device 24 in the embodiment of FIG. 4. The upper rollers 25a and 26a are mounted on each side in double-arm levers 27. These levers 27 take the form of angled levers. A power storage means in the form of the counter-balancing cylinder 23 is attached to the free end of each lever 27. Again, a respective plunger 8 and 9 is effective on the associated end of each lever 27. The feed channel 1, in which the aforesaid housing block 28 incorporating the cracking rollers 2 and 3 and a not shown accelerator are also mounted, is attached to the chopping device 24.

Figure 5:
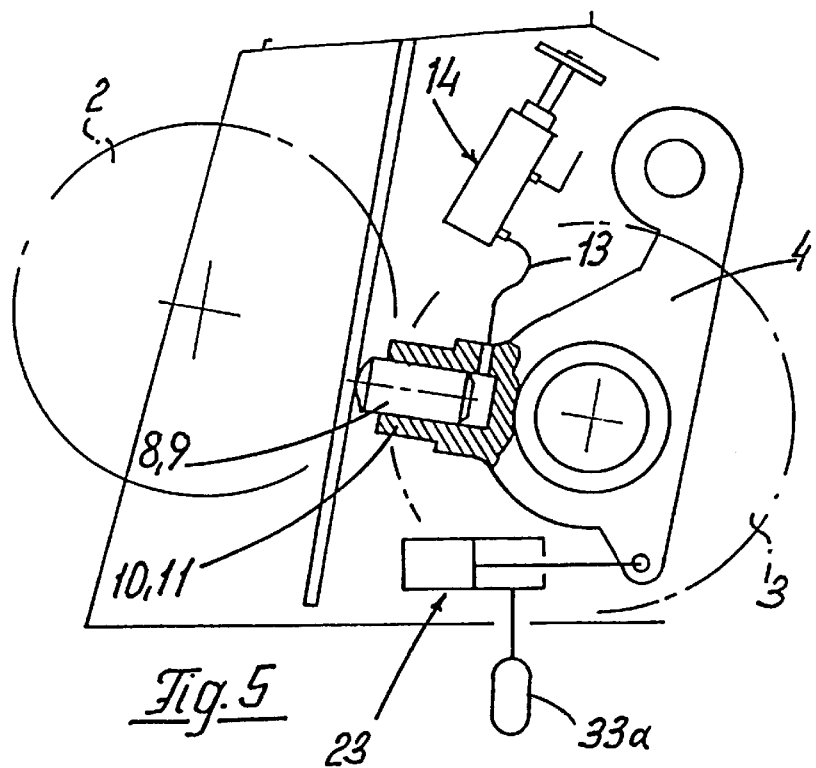
FIG. 5 is a schematic view showing another embodiment of the control unit used with a pair of cracking rollers.

The embodiment of FIG. 5 corresponds in substance to the embodiment of FIGS. 1 and 2. In FIG. 5 however, the cylinders 10, 11 are rigidly mounted on the pivotal rocker arms 4 so that the traversable plungers 8, 9 rest on fixedly located parts of the machine chassis. In this simplified embodiment, the levers 6 and the springs 7 are replaced by the two counter-balancing cylinders 23 and the attached accumulator 33a. A particularly economical arrangement is thereby achieved.

Figure 6:
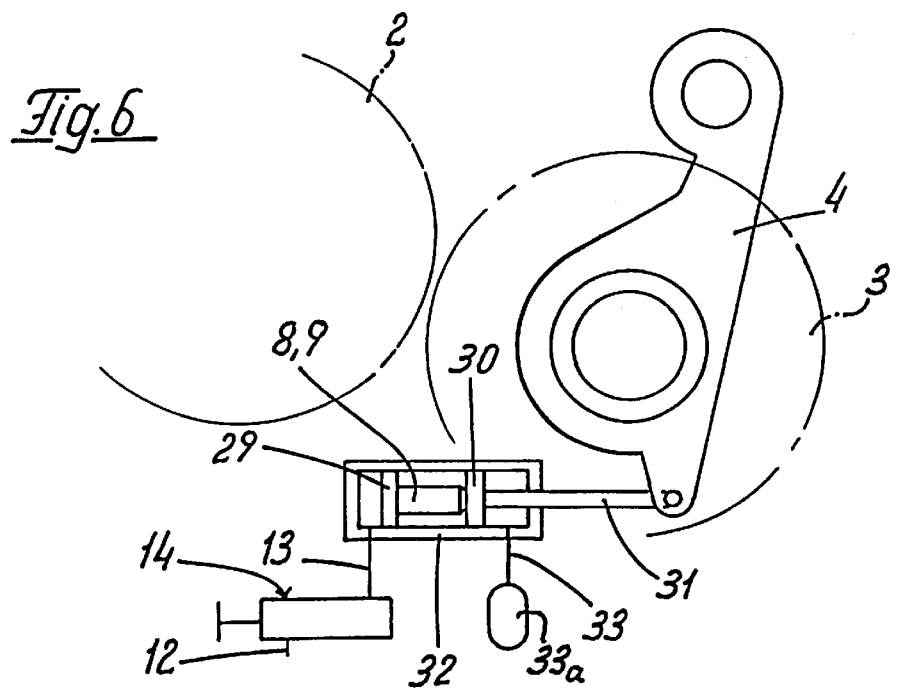
FIG. 6 is a schematic view similar to FIG. 5 and showing a third embodiment of the control unit used for the adjustment of a pair of cracking rollers in correspondence with FIGS. 1 and 5.

The embodiment of FIG. 6 corresponds to the embodiments of FIGS. 1, 2 and 5 in regard to the arrangement of the cracking rollers 2, 3 but in a departure from the embodiment of FIG. 5, the cylinders 10, 11, plungers 8, 9 and counter-balancing cylinder 23 are comprised in a cylinder 32. Each piston 29 and 30 and the respective plunger 8 and 9 are arranged in a common cylinder 32. The plungers 8, 9 are arranged in the cylinder 32 with one end in contact with piston 29 in the direction of the rocker arms 4 and the opposite end in contact with piston 30 which is attached to a piston rod 31. The piston rod 31 engages the appertaining lateral rocker arm 4. A connector 14 for pressure line 12 or 13 is provided at the end thereof remote from the rocker arm 4. A connector 14 is at the end of pressure line 33 facing the rocker arm 4. The pressurized medium for the arrangement flows out of an accumulator 33a. A specific pressure is applied to the plunger 8 or 9 by the piston 30 in the normal operational state. The piston 29 will be moved appropriately so as to alter the width of the passage between the rollers 2, 3 in dependence on the direction and the amount by which the piston 15 is displaced when it is being adjusted.

In another embodiment, the plungers 8 or 9 may be arranged in closed cylinders, and the plungers 8 or 9 may co-operate with adjusting pistons 29 or 30. The adjusting piston would be attached to one end of a piston rod 31. The other end of the piston rod 31 would be articulated to the machine elements or the groups of elements that are to be adjusted. Independent of the above alternatives, the plungers 8 or 9 arranged on each side of the machine element or the group of elements may be adjusted using one actuating element. Since an agricultural harvesting machine is inevitably equipped with a hydraulic system, a control unit can also be in the form of a hydraulic adjusting unit equipped with screw-joint fittings for filling and venting purposes.

Other objects, features and advantages will be apparent to those skilled in the art. While preferred embodiments of the invention have been illustrated and described, this has been done by way of illustration and the invention should not be limited except as required by the scope of the appended claims.

We claim:

1. A control unit for an agricultural machine having feed means for feeding harvested crops along a feed path, a plurality of machine elements along the feed path, resilient means for moving one of the machine elements relative to another; adjustable stops for limiting movement of the resilient means; and the control unit including a plurality of hydraulic cylinders each having a moveable wall and each forming one of the adjustable stops, and means for supplying controlled amounts of hydraulic fluid to each of the hydraulic cylinders to move the respective moveable walls a controlled distance; and thereby moving said one and other machine elements relative to each other, wherein the means for supplying includes a multi-chamber pump.

2. A control unit for an agricultural machine as set forth in claim 1, wherein the means for supplying feeds effectively equal amounts of the hydraulic fluid to each of the hydraulic cylinders to move the respective moveable walls an effectively equal distance.

3. A control unit for an agricultural machine as set forth in claim 1, including a plurality of plungers; and wherein the multi-chamber pump supplies the same volume of hydraulic fluid to each of the hydraulic cylinders, the hydraulic cylinders displace the plungers at substantially equal distances, and the plungers adjust the machine elements.

4. A control unit for an agricultural machine as set forth in claim 1, wherein the multi-chamber pump is located in an operator's cab of the agricultural harvesting machine.

5. A control unit for an agricultural machine as set forth in claim 1, wherein the number of chambers in the multi-chamber pump is equal to the number of hydraulic cylinders controlled.

6. A control unit for an agricultural machine as set forth in claim 1, wherein the multi-chamber pump includes a stepped piston which, when moved, effects consistent changes in the quantity of fluid into and out of each of the chambers of the multi-chamber pump during operation of the piston.

7. A control unit for an agricultural machine as set forth in claim 1, wherein the piston of the multi-chamber pump is adjustable manually.

8. A control unit for an agricultural machine as set forth in claim 1, wherein the piston of the multi-chamber pump is adjustable by means of a servo-mechanism.

9. A control unit for an agricultural machine as set forth in claim 1, wherein the machine elements include a concave and a threshing cylinder; and the resilient means moves the concave relative to the threshing cylinder.

10. A control unit for an agricultural machine having feed means for feeding harvested crops along a feed path, a plurality of machine elements along the feed path, resilient means for moving one of the machine elements relative to an other; adjustable stops for limiting movement of the resilient means; and the control unit including a plurality of hydraulic cylinders each having a moveable wall and each forming one of the adjustable stops, and means for supplying controlled amounts of hydraulic fluid to each of the hydraulic cylinders to move the respective moveable walls a controlled distance; and thereby moving said one and other machine elements relative to each other, the machine elements including levers, rocker arms and two cracking rollers projecting into the feed path; the cracking rollers including fixed and adjustable cracking rollers; means for driving the cracking rollers in opposite directions, means for mounting the adjustable cracking roller to the rocker arms for movement with respect to the fixed cracking roller; and the levers being articulated to the rocker arms and the rocker arms being pivotal along a generally horizontal axis.

11. A control unit for an agricultural machine as set forth in claim 10, including a plurality of plungers, and wherein the adjustable cracking roller is moved towards and away from the fixed cracking roller for varying the feed path width via the plungers acting on the rocker arms.

12. A control unit for an agricultural machine having feed means for feeding harvested crops along a feed path, a plurality of machine elements along the feed path, resilient means for moving one of the machine elements relative to an other; adjustable stops for limiting movement of the resilient means; and the control unit including a plurality of hydraulic cylinders each having a moveable wall and each forming one of the adjustable stops, and means for supplying controlled amounts of hydraulic fluid to each of the hydraulic cylinders to move the respective moveable walls a controlled distance; and thereby moving said one and other machine elements relative to each other, the moveable walls being plungers disposed in the hydraulic cylinders in displaceable manner, the plungers being moveable in synchronism by the means for supplying controlled amounts of hydraulic fluid to each of the hydraulic cylinders, and the plungers being either directly or indirectly applied against said machine elements.

13. A control unit for an agricultural machine having a machine chassis, feed means for feeding harvested crops along a feed path, a plurality of machine elements along the feed path, resilient means for moving one of the machine elements relative to an other; adjustable stops for limiting movement of the resilient means; and the control unit including a plurality of hydraulic cylinders each having a moveable wall and each forming one of the adjustable stops, and means for supplying controlled amounts of hydraulic fluid to each of the hydraulic cylinders to move the respective moveable walls a controlled distance; and thereby moving said one and other machine elements relative to each other, and rocker arms for mounting one of the machine elements; each hydraulic cylinder being rigidly mounted on one of the rocker arms, and the moveable walls being plungers acting on the machine chassis.

14. A control unit for an agricultural machine having feed means for feeding harvested crops along a feed path, a plurality of machine elements along the feed path, resilient means for moving one of the machine elements relative to an other; adjustable stops for limiting movement of the resilient means; and the control unit including a plurality of hydraulic cylinders each having a moveable wall and each forming one of the adjustable stops, and means for supplying controlled amounts of hydraulic fluid to each of the hydraulic cylinders to move the respective moveable walls a controlled distance; and thereby moving said one and other machine elements relative to each other, a plurality of double-arm levers, and the resilient means being counterbalancing cylinders connected to said levers.

15. A control unit for an agricultural machine having feed means for feeding harvested crops along a feed path, a plurality of machine elements along the feed path, resilient means for moving one of the machine elements relative to an other; adjustable stops for limiting movement of the resilient means; and the control unit including a plurality of hydraulic cylinders each having a moveable wall and each forming one of the adjustable stops, and means for supplying controlled amounts of hydraulic fluid to each of the hydraulic cylinders to move the respective moveable walls a controlled distance; and thereby moving said one and other machine elements relative to each other, the moveable walls being pistons, and the resilient means including counterbalancing cylinders.

16. A control unit for an agricultural machine having feed means for feeding harvested crops along a feed path, a plurality of machine elements along the feed path, resilient means for moving one of the machine elements relative to an other; adjustable stops for limiting movement of the resilient means; and the control unit including a plurality of hydraulic cylinders each having a moveable wall and each forming one of the adjustable stops, and means for supplying controlled amounts of hydraulic fluid to each of the hydraulic cylinders to move the respective moveable walls a controlled distance; and thereby moving said one and other machine elements relative to each other, the resilient means being part of each hydraulic cylinder to form a common cylinder.

17. A control unit for an agricultural machine as set forth in claim 16, wherein the common cylinder is a closed cylinder, each moveable wall includes two pistons attached to a piston rod and a plunger sandwiched therebetween, and the piston rod has a distal end articulated to one of the machine elements.

* * * * *